(12) United States Patent
Kyllonen

(10) Patent No.: US 10,171,133 B1
(45) Date of Patent: Jan. 1, 2019

(54) TRANSPONDER ARRANGEMENT

(71) Applicant: AUTOMATED ASSEMBLY CORPORATION, Lakeville, MN (US)

(72) Inventor: Kimmo Kyllonen, Shakopee, MN (US)

(73) Assignee: Automated Assembly Corporation, Lakeville, MN (US)

( * ) Notice: Subject to any disclaimer, the term of this patent is extended or adjusted under 35 U.S.C. 154(b) by 0 days.

(21) Appl. No.: 15/900,220

(22) Filed: Feb. 20, 2018

(51) Int. Cl.
*H04B 5/00* (2006.01)

(52) U.S. Cl.
CPC ................. *H04B 5/0068* (2013.01)

(58) Field of Classification Search
CPC ...... H04B 5/0068; H04B 5/0081; H04B 7/02; H04B 7/04; H04B 1/40
See application file for complete search history.

(56) References Cited

U.S. PATENT DOCUMENTS

| | | | |
|---|---|---|---|
| 5,471,010 A | 11/1995 | Bockelman et al. | |
| 6,016,129 A * | 1/2000 | Lauper | H01Q 1/3225 343/711 |
| 6,262,513 B1 | 7/2001 | Furukawa et al. | |
| 6,265,977 B1 * | 7/2001 | Vega | G06K 19/0723 257/679 |
| 6,822,340 B2 | 11/2004 | Lamson | |
| 7,119,693 B1 | 10/2006 | Devilbiss | |
| 7,154,046 B2 | 12/2006 | Chung | |
| 7,262,701 B1 | 8/2007 | Nguyen | |
| 7,446,727 B2 | 11/2008 | Kai et al. | |
| 7,692,546 B2 | 4/2010 | Camp et al. | |
| 7,714,334 B2 | 5/2010 | Lin | |
| 7,745,253 B2 | 6/2010 | Luechinger | |
| 7,875,504 B2 | 1/2011 | Silverbrook et al. | |
| 7,989,949 B2 | 8/2011 | Gupta et al. | |
| 8,012,362 B2 | 9/2011 | Usui et al. | |
| 8,089,416 B2 | 1/2012 | Chung et al. | |
| 8,102,038 B2 | 1/2012 | Sahasrabudhe et al. | |
| 8,217,849 B2 | 7/2012 | Sardariani et al. | |
| 8,248,314 B2 | 8/2012 | Ash, Jr. et al. | |
| 8,522,431 B2 | 9/2013 | Finn | |

(Continued)

FOREIGN PATENT DOCUMENTS

JP 01151220 A 6/1989

OTHER PUBLICATIONS

Lifländer, "Radiated Efficiency: A True Measure of Antenna Performance," Pulse Finland Oy, White Paper G040.A, www.pulseelectronics.com/library/white_papers/ (Nov. 2010).

(Continued)

*Primary Examiner* — Andrew Wendell
(74) *Attorney, Agent, or Firm* — Crawford Maunu PLLC

(57) ABSTRACT

A transponder arrangement includes a substrate, an RF transponder, and first, second, and third antenna elements. The substrate has a first surface and an opposing second surface. The RF transponder is disposed on the first surface of the substrate and has a first connection pad and a second connection pad. The first antenna element is disposed on the first surface of the substrate and is connected to the first connection pad. The second antenna element is disposed on the first surface of the substrate and is connected to the second connection pad. The third antenna element is disposed on the second surface of the substrate and is inductively coupled to the first and second antenna elements.

13 Claims, 5 Drawing Sheets

(56) References Cited

U.S. PATENT DOCUMENTS

| | | |
|---|---|---|
| 8,570,230 B2 | 10/2013 | Matsunaga et al. |
| 8,717,244 B2 | 5/2014 | Joyce, Jr. et al. |
| 8,730,121 B2 | 5/2014 | Jiang et al. |
| 8,860,162 B2 | 10/2014 | Linderman et al. |
| 9,047,549 B2 | 6/2015 | Yamanaka et al. |
| 9,088,066 B2 | 7/2015 | Levionnais et al. |
| 9,196,958 B2 | 11/2015 | Arnold et al. |
| 9,287,626 B2 | 3/2016 | Zou |
| 9,431,363 B1 | 8/2016 | Lindblad et al. |
| 9,565,752 B1 | 2/2017 | Neuman et al. |
| 9,647,160 B2 | 5/2017 | Krajewski |
| 2002/0053735 A1 | 5/2002 | Neuhaus et al. |
| 2003/0122233 A1 | 7/2003 | Yagi et al. |
| 2005/0128086 A1 | 6/2005 | Brown et al. |
| 2005/0133928 A1 | 6/2005 | Howard et al. |
| 2005/0205985 A1 | 9/2005 | Smith et al. |
| 2005/0253286 A1 | 11/2005 | Yoshikawa et al. |
| 2005/0276028 A1* | 12/2005 | Yeo .................. G06K 19/07749 361/760 |
| 2008/0278793 A1 | 11/2008 | Tonar et al. |
| 2009/0261444 A1 | 10/2009 | Yamazaki et al. |
| 2010/0164671 A1* | 7/2010 | Pagani .................... H01L 23/48 336/200 |
| 2011/0064788 A1 | 3/2011 | Weimann |
| 2011/0169641 A1 | 7/2011 | Lin |
| 2011/0304327 A1 | 12/2011 | Ausserlechner |
| 2012/0126418 A1 | 5/2012 | Feng et al. |
| 2013/0062419 A1 | 3/2013 | Finn et al. |
| 2013/0271265 A1* | 10/2013 | Finn ..................... H01Q 1/2225 340/10.1 |
| 2014/0014732 A1* | 1/2014 | Finn ..................... G06K 19/077 235/492 |
| 2014/0036337 A1 | 2/2014 | Neuman et al. |
| 2014/0239509 A1 | 8/2014 | Kim et al. |
| 2015/0187729 A1 | 7/2015 | Chew |
| 2015/0229017 A1 | 8/2015 | Suzuki et al. |
| 2015/0344294 A1 | 12/2015 | Ghahremani et al. |
| 2016/0056544 A1* | 2/2016 | Garcia .................. H01Q 21/28 343/725 |
| 2016/0079675 A1* | 3/2016 | Van Zeijl ............ H01Q 1/2283 343/786 |
| 2018/0012430 A1* | 1/2018 | McLeod ............ G07C 9/00039 |
| 2018/0069294 A1* | 3/2018 | Kang .................. H01Q 1/2291 |

OTHER PUBLICATIONS

Lindblad et al., "Wire Bonded IC Components to Round Wire", U.S. Appl. No. 14/553,519, filed Nov. 25, 2014. (Cited above as 9431363).

Tran et al., "Compact Crossed Dipole Antenna for a Broadband UHF-RFID Tag," The 2015 Int'l Workshop on Antenna Technology (iWAT), 2015 Proceedings IEEE, pp. 379-380, IEEE (Mar. 4, 2015).

Zeng et al., "A Broadband Antenna for Multi-Standard UHF RFID Tag Applications," 2010 Int'l Conf on Microwave and Millimeter Wave Tech (ICMMT), 2010 Proceedings, IEEE, pp. 1898-1900 (Jul. 26, 2010).

* cited by examiner

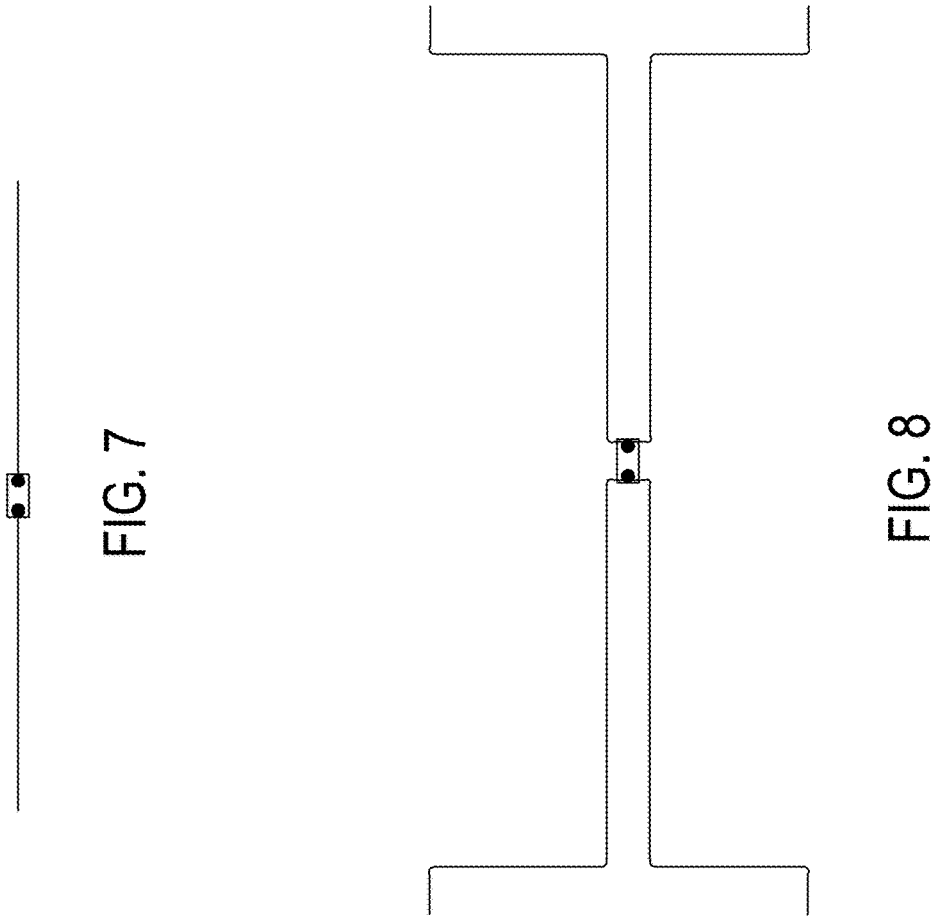

TRANSPONDER ARRANGEMENT

FIELD OF THE INVENTION

The disclosure describes differential antenna arrangements.

BACKGROUND

Many automated toll collection systems rely on RFID technology. Example applications include collecting tolls for roadway usage, parking, use of high occupancy toll/vehicle (HOT/HOV) lanes, and access to public transportation. Other exemplary applications or RFID technology include tracking the locations of objects and controlling access to restricted areas or facilities.

RFID makers face the ongoing challenge of making RFID tags that are both functional and economically competitive. For many applications, RF transponders and associated wiring are attached to a flexible substrate. Prior to mounting the electronic device, wiring patterns may be formed on the substrate using a print-and-etch process to construct the antenna. Making RF transponder arrangements on a flexible substrate may be prohibitively expensive for some applications. The expense is attributable in part to the print-and-etch processes used in creating the wiring pattern. Expensive chemicals are required for print-and-etch processes, and hazardous waste is a byproduct.

SUMMARY

A disclosed transponder arrangement includes a substrate, an RF transponder, and first, second, and third antenna elements. The substrate has a first surface and an opposing second surface. The RF transponder is disposed on the first surface of the substrate and has a first connection pad and a second connection pad. The first antenna element is disposed on the first surface of the substrate and is connected to the first connection pad. The second antenna element is disposed on the first surface of the substrate and is connected to the second connection pad. The third antenna element is disposed on the second surface of the substrate and is inductively coupled to the first and second antenna elements.

The above summary is not intended to describe each disclosed embodiment. The figures and detailed description that follow provide additional example embodiments.

BRIEF DESCRIPTION OF THE DRAWINGS

Other aspects and advantages will become apparent upon review of the Detailed Description and upon reference to the drawings in which:

FIG. 7 shows an alternative dipole antenna pattern; and

FIG. 8 shows another alternative dipole antenna pattern.

DETAILED DESCRIPTION

Figure 1:
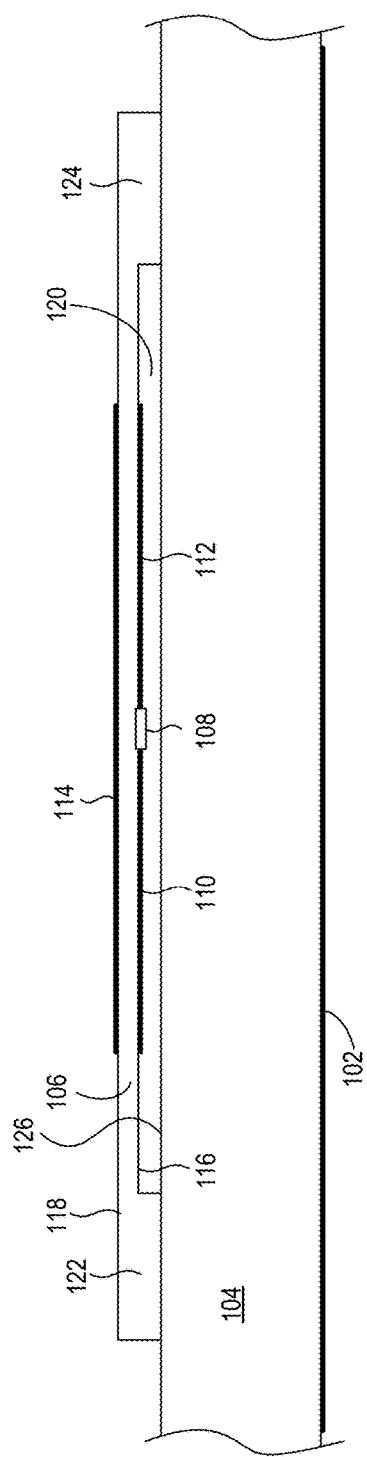
FIG. 1 shows cross-sectional side view of a transponder arrangement attached to an article having a metallic component.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Terms such as over, under, top, bottom, above, below, may be used herein to refer to relative positions of elements as shown in the figures. It should be understood that the terminology is used for notational convenience only and that in actual use the disclosed structures may be oriented different from the orientation shown in the figures. Thus, the terms should not be construed in a limiting manner.

Antenna designers face a number of challenges in designing antennas for RF transponders. The designer must design the antenna to exhibit a suitable radiation pattern and eliminate undesirable nulls. The antenna must have sufficient gain to provide a desired range and sensitivity for the intended application. The impedance of the antenna must be matched to connection pads of integrated circuitry. Even a small change to a physical characteristic of an antenna can make the antenna unsuitable for the desired application.

Changes in automotive technology present new challenges for RF transponders. In an exemplary application, an RF transponder can be attached to a window of a vehicle for purposes of collecting a toll as the vehicle passes by a reader on a roadway. Some newer vehicles have a heating element, consisting of strands of fine-gauge wire, embedded in the windshield for purposes of defogging and/or defrosting the windshield. The heating element creates a problem for RF transponders attached to the inside surface of the windshield. The wiring of the heating element blocks transmission of RF signals, thereby preventing reading from an RF transponder. Even if an RF transponder is attached to the exterior surface of a windshield having a heating element, the heating element can act as a ground plane, absorbing RF energy from the RF transponder and significantly reducing the RF energy observed outside the vehicle.

In one approach to ameliorating the effects of the heating element, the RF transponder can be separated from the heating element by an air gap. A standoff structure can be combined with other packaging to provide an air space between the RF transponder and the heating element. However, the resulting structure can be to too thick for practical applications as the structure may interfere with clearing moisture or ice from the exterior surface of the windshield.

Further challenges faced by the antenna designer are those associated with manufacturability. For example, in order for the resulting product to be cost effective the designer must consider the speed at which the antenna and associated structure can be manufactured, the cost of materials, and the complexity of the manufacturing process. In addition, the desired durability and size of the resulting product will affect the manufacturability and performance of the antenna. Thus, every characteristic of the antenna design can be critical for the antenna to operate in the desired application.

The disclosed antenna arrangement has been found to be suitable for vehicle tolling applications, such as applications in which RF transponders are attached to vehicles for assessing fees as vehicles pass by a reader such as in a toll booth or toll plaza. Those skilled in the art will recognize that the disclosed structures may be deployed in other applications depending on the antenna performance requirements and cost restrictions. Applications involving RF signals having frequencies greater than 300 MHz and less than 3.0 GHz are expected to benefit from the disclosed structures.

In accordance with the disclosed transponder arrangements, a dipole antenna is supplemented with an inductively coupled supplemental antenna element. The dipole antenna elements and an RF transponder are disposed on one surface of a substrate, and the supplemental element is disposed on the opposing surface of the substrate. The dipole elements are oriented parallel to the supplemental element.

The transponder arrangement can be structured to provide separation between the dipole antenna elements and an environmental metallic structure that would act as a ground plane and block RF energy from the RF transponder. The separation can be an air-filled void or additional material having a dielectric constant that is less than the dielectric constant of the substrate. The much greater dielectric constant of the substrate relative to the dielectric constant of air or the separating material benefits inductive coupling of the dipole elements to the third element. The improved inductive coupling provides a desired radiation pattern with sufficient energy for reading the tag.

Each of the dipole antenna elements is one-fourth wavelength of the target RF wave, and the supplemental antenna element is one-half wavelength of the target RF wave. In an exemplary implementation, the dipole antenna elements can be round wire, and the supplemental element can be a metallic foil.

FIG. 1 shows cross-sectional side view of a transponder arrangement attached to an article having a metallic component. The metallic component would block RF energy from a transponder in a structure not having the improvements provided by the disclosed structures. In an exemplary environment or application, the metallic component is a heating element 102 attached to a panel of glass 104, such as a windshield. The RF transponder may be packaged or unpackaged (a "bare die"), and active, semi-active, semi-passive, or passive according to application requirements.

The transponder arrangement includes a substrate 106, an RF transponder integrated circuit (IC) 108, dipole antenna elements 110 and 112, and a supplemental antenna element 114. The RF transponder IC and dipole antenna elements are attached to one surface 116 of the substrate, and the supplemental antenna element is attached to the opposing surface 118 of the substrate. The opposing surfaces 116 and 118 are parallel, making supplemental antenna element parallel to the dipole antenna elements. Though not shown, it will be recognized that the RF transponder IC and antenna elements can be attached to the substrate by an adhesive.

In order to prevent the heating element 102 from blocking RF energy from the RF transponder 108, the structure of the transponder arrangement separates the dipole antenna elements 110 and 112 from the heating element by a void or material having a dielectric constant that is less than the dielectric constant of the substrate 106. The exemplary structure of FIG. 1 creates a void 120. The air-filled void has a dielectric constant equal to 1. The substrate 106, which can be rigid or flexible depending on application requirements, can be a polyethylene terephthalate (PET), a polyelectrolyte multilayers (PEMs), paper, a high-density polyethylene, a vinyl, or adhesive transfer tape, for example. The exemplary materials all have dielectric constants that are much greater than 1.

As the dielectric constant of the substrate 106 is much greater than the dielectric constant of the air in the void 120, the supplemental antenna element 114, rather than the heating element 102, is inductively coupled to the dipole antenna elements. In an exemplary implementation, the void can be created by a stand-off structure. The stand-off structure can be an integral part of the substrate or separate material attached to the substrate by an adhesive for example. The exemplary stand-off structure includes legs 122 and 124 that extend from the surface 116 of the substrate.

In an exemplary implementation, the electrical length of each of the dipole antenna elements 110 and 112 is one-fourth wavelength of a radio wave of a target radio frequency, and the electrical length of the supplemental antenna element is one-half wavelength of the radio wave of the target radio frequency. The target radio frequency can vary depending on the desired application.

The dipole antenna elements 110 and 112 can be fine gauge, round wire, and the supplemental antenna element can be a metallic foil in an exemplary implementation. Rather than using expensive print-and-etch techniques for the dipole antenna elements, the wire of the dipole antenna elements can be adhered to the substrate by a pressure-sensitive adhesive. The antenna wire is a fine gauge, round (round cross-section), bare wire. For example, 44 gauge (AWG) or equivalent copper, silver-coated copper, or aluminum wire has been found to be suitable for some applications, though the gauge and material may be different for other applications. "Wire" as used herein does not refer to printed or printed-and-etched patterns of conductive material. Rather, as used herein, wire refers to one or more strands of conductive material that have been made, for example, by drawing the conductive material through draw plates, such that the wire has a round cross section. Using a fine gauge copper wire to make antenna elements eliminates the use of environmentally hazardous chemicals as would be required for printing and etching.

In other implementations, the dipole antenna elements and/or the supplemental antenna element can be copper traces formed by printing and etching copper on a flexible or rigid printed circuit board.

In an exemplary implementation, the gap between the surface 116 of the substrate 106 and the surface 126 of the glass 104 is 1 mm, and the substrate is 1 mm thick. The transponder arrangement can be laminated or encased to protect the components from damage.

Figure 2:
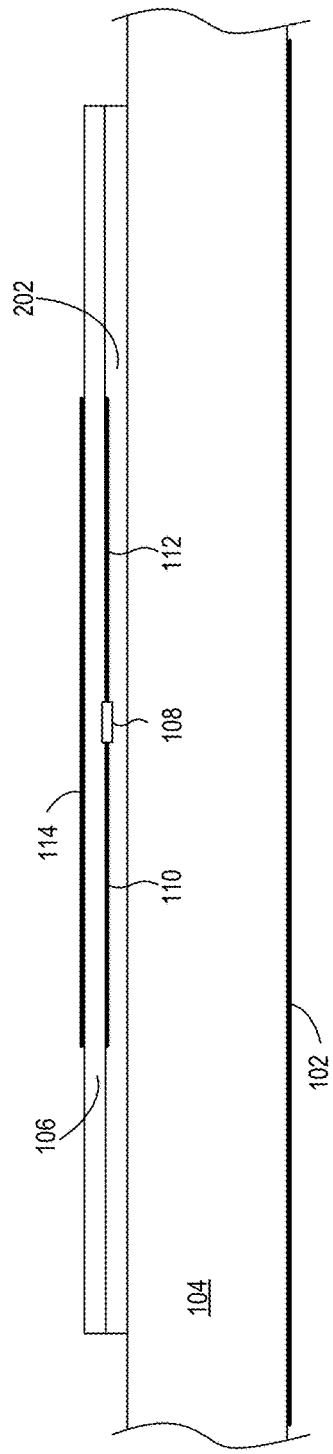
FIG. 2 shows cross-sectional side view of another implementation of a transponder arrangement attached to an article having a metallic component.

FIG. 2 shows cross-sectional side view of another implementation of a transponder arrangement attached to an article having a metallic component. The structure of FIG. 2 is similar to the structure of FIG. 1, with the exception of the separation between the dipole antenna elements and the surface of the glass being provided by a spacer layer. The spacer layer 202 can be a layer of solid foam having a dielectric constant approximately equal to the dielectric constant of air, for example. Other materials having dielectric constants that are much less than the dielectric constant of the substrate 106 may also be suitable.

Figure 3:
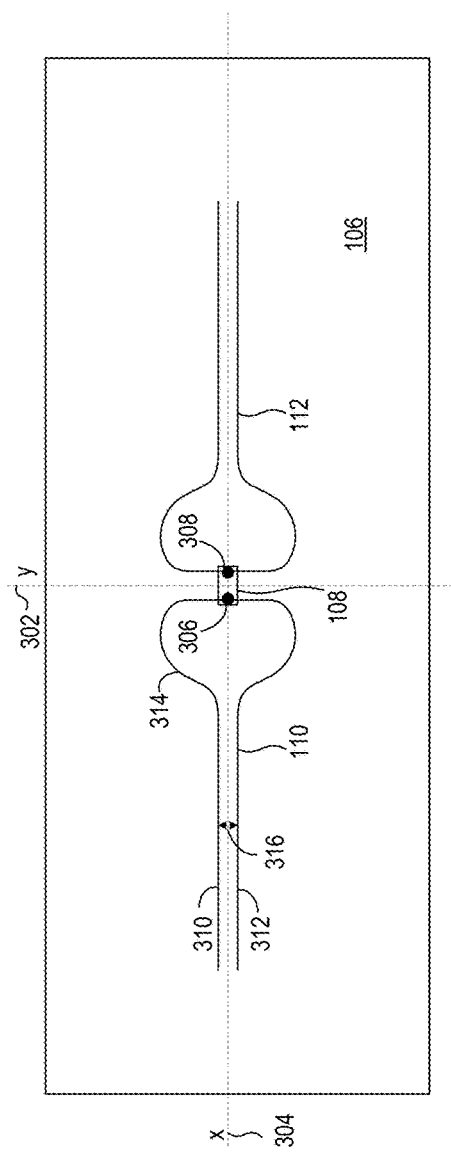
FIG. 3 shows an exemplary antenna pattern of the dipole antenna elements.

FIG. 3 shows an exemplary antenna pattern of the dipole antenna elements 110 and 112. The first and second dipole antenna elements are symmetric about a y-axis 302. Each of the first and second dipole antenna elements includes two branches that are symmetric about an x-axis 304, and the two branches of each dipole antenna element are connected to the connection pads 306 and 308.

The branches of antenna element 110 include second segments 310 and 312, and the branches of antenna element 112 include similar segments. The segments 310 and 312 are connected to connection pad 306 by a looped portion 314. The looped portion 314 can be connected to the connection pad 306 by wire bonds or solder joints, for example.

In one implementation, the parallel segments provide the main radiating energy. The width of the gap 316 separating the segments 310 and 312 tunes impedance of the antenna, and the lengths of the segments tune frequency of the antenna. The looped portion 314 may improve manufacturability of the RF transponder arrangement. If the transponder IC 108 has connection pads exposed (facing away from the substrate 106), the antenna wire can be laid over the connection pads in a continuous thread and then attached to the connection pads such as by soldering or welding.

The lengths of the segments 310 and 312 (and similar segments of antenna element 112) are made to accommodate a desired form factor and achieve a desired radiation pattern and power level. An exemplary application for the disclosed antenna shapes is fee tolling of motor vehicles. The RF transponder arrangement can be approximately the size of a business card or a credit card and attached to the vehicle. The antenna pattern can be scaled up or down for other applications. In an exemplary application, the end product having the antenna arrangement is approximately four inches by one-half inch.

Figure 4:
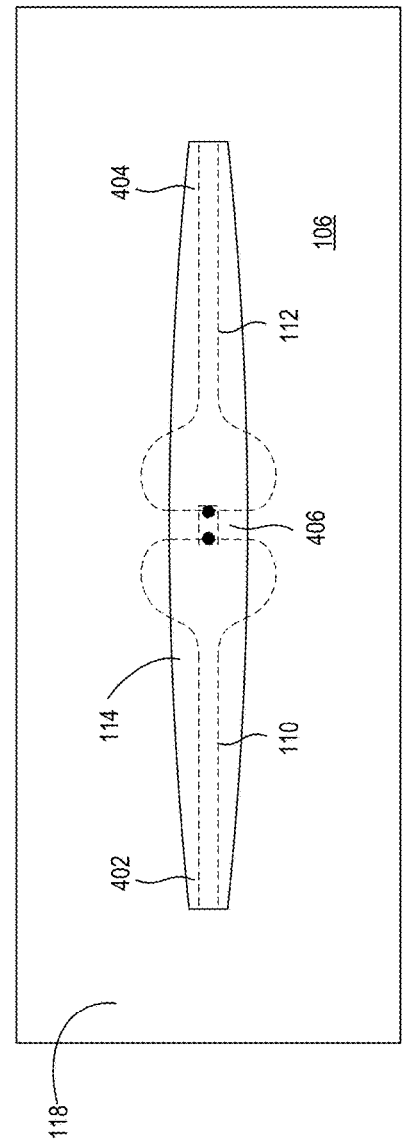
FIG. 4 shows a top view of an exemplary transponder arrangement.

FIG. 4 shows a top view of an exemplary transponder arrangement. The supplemental antenna element 114 is attached to the surface 118 of the substrate 106. The supplemental antenna element can be a metallic foil, such as copper, attached to the substrate by an adhesive. Alternatively, the supplemental antenna element can be a portion of a metal layer remaining after print-and-etch processes.

The shape of the supplemental antenna element is selected to tune impedance, frequency and shape the radiation pattern. In one implementation, the supplemental antenna element can be shaped as an elongated oval having truncated ends. The exemplary elongated oval has end portions 402 and 404 and a middle portion 406. The width of the middle portion is greater than the widths of the end portions. The supplemental antenna element 114 is disposed directly over a major portion of the dipole antenna element 110 and directly over a major portion of the dipole antenna element 112. That is, the supplemental antenna element covers more than one half of a projection of the dipole antenna elements through the substrate. Other shapes may be feasible for the supplemental antenna element so long as the electrical length of the supplemental antenna element is one-half wavelength of the radio wave of the target radio frequency, and the supplemental antenna element is disposed parallel with the dipole antenna elements and covers most of the dipole antenna elements. For example, the supplemental antenna element can have non-linear and/or irregularly curved sides and can have voids having no metal.

Figure 5:
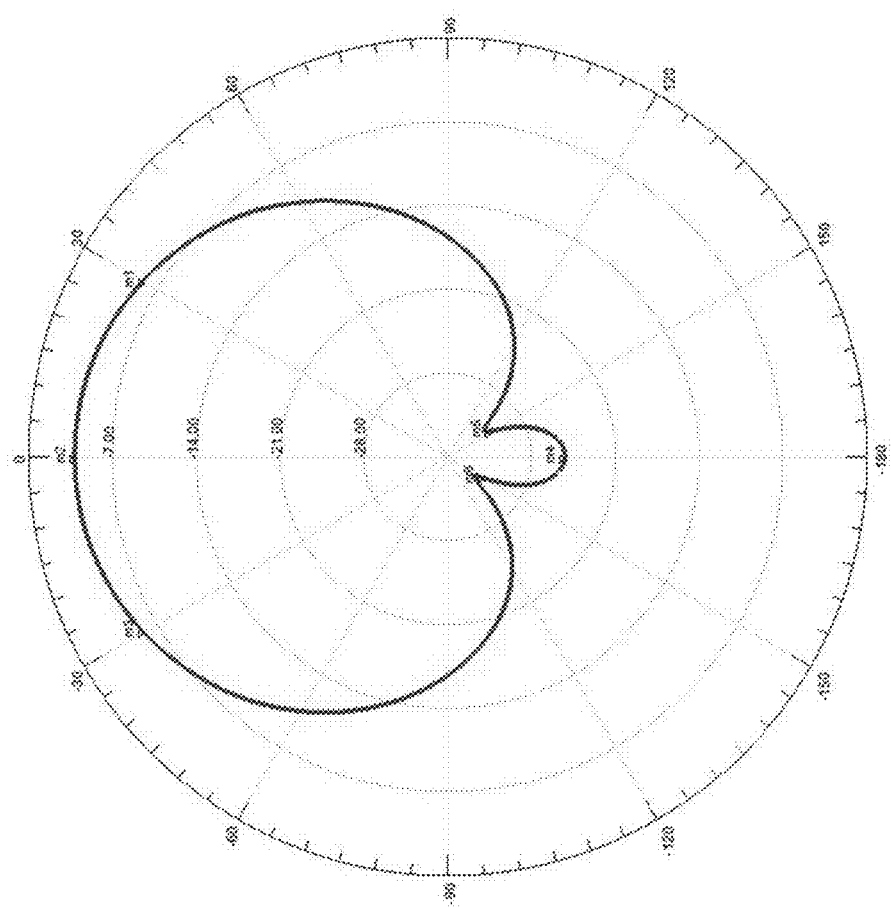
FIG. 5 shows a simulated radiation pattern of an antenna arrangement having dipole antenna elements without a supplemental antenna element.
Figure 6:
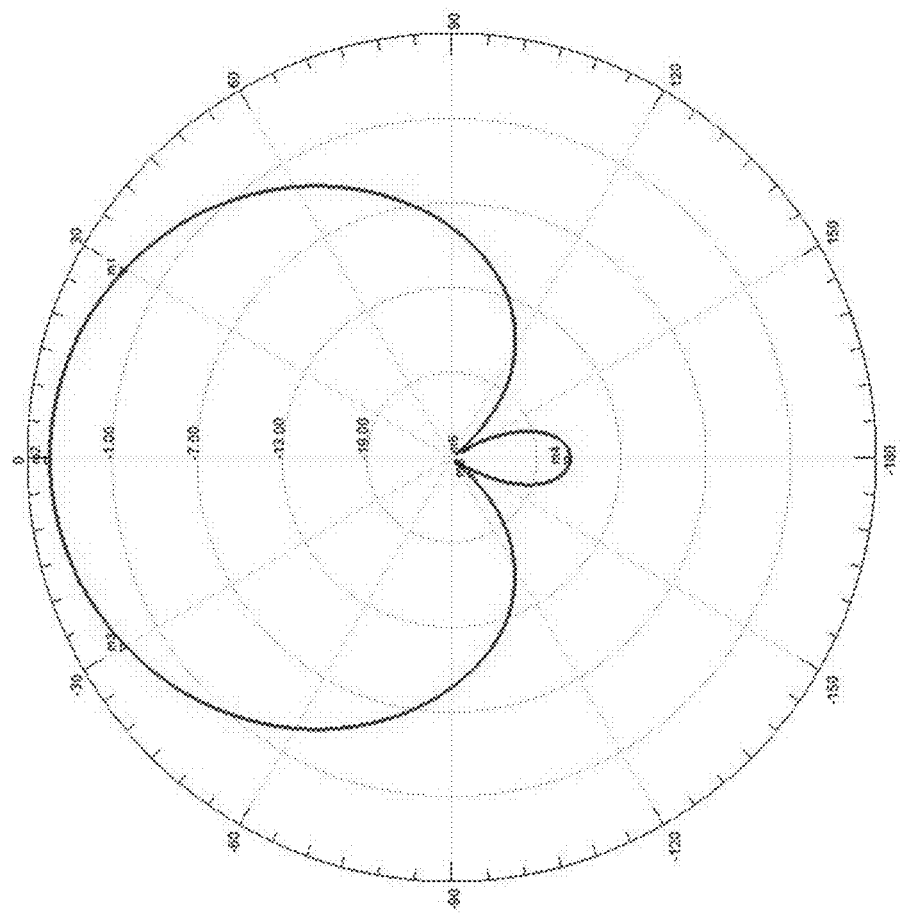
FIG. 6 shows a simulated radiation pattern of an antenna arrangement having dipole antenna elements in combination with a supplemental antenna element.

FIGS. 5 and 6 show simulated radiation patterns of first and second antenna arrangements having dipole antenna elements without and with a supplemental antenna element. FIG. 5 shows a simulated radiation pattern of an antenna arrangement having dipole antenna elements without a supplemental antenna element. FIG. 6 shows a simulated radiation pattern of an antenna arrangement having dipole antenna elements in combination with a supplemental antenna element.

The graphs illustrate a substantial improvement in antenna gain with the antenna arrangement having the supplemental antenna element. For example, FIG. 5 shows that at phase angles 30° and −30°, the antenna gain is −5.6645 dB and −5.7108 dB, respectively, for an antenna arrangement not having a supplemental element, and FIG. 6 shows that an antenna arrangement having a supplemental element the antenna gain is 1.6228 dB and 1.6220 dB at phase angles 30° and −30°.

FIGS. 7 and 8 show alternative dipole antenna patterns that can be paired with the supplemental antenna element and stand-off structures disclosed herein. FIG. 7 shows an exemplary dipole antenna pattern in which each dipole antenna element is a single segment of wire connected to and extending in a straight line from the transponder IC. FIG. 8 shows an exemplary dipole antenna pattern in which each dipole antenna element has multiple segments. Each dipole antenna element has a pair of parallel segments extending from the transponder IC, and an additional segment extends orthogonally from each segment of the parallel pair The present invention is thought to be applicable to a variety of applications. Other aspects and embodiments will be apparent to those skilled in the art from consideration of the specification and practice of the circuits and methods disclosed herein. It is intended that the specification and illustrated embodiments be considered as examples only, with a true scope of the invention being indicated by the following claims.

What is claimed is:

1. A transponder arrangement, comprising:
   a substrate having a first surface and an opposing second surface;
   a radio frequency (RF) transponder disposed on the first surface of the substrate and having a first connection pad and a second connection pad;
   a first antenna element disposed on the first surface of the substrate and connected to the first connection pad;
   a second antenna element disposed on the first surface of the substrate and connected to the second connection pad; and
   a third antenna element disposed on the second surface of the substrate and inductively coupled to the first and second antenna elements.

2. The transponder arrangement of claim 1, further comprising a standoff structure attached to the substrate and having a shape that forms a void bounded by the standoff structure and the first surface of the substrate.

3. The transponder arrangement of claim 2, wherein a dielectric constant of a portion of the substrate between the RF transponder and the third antenna element is greater than one.

4. The transponder arrangement of claim 2, wherein the standoff structure is an integral portion of the substrate.

5. The transponder arrangement of claim 2, wherein the standoff structure is attached to the substrate by an adhesive.

6. The transponder arrangement of claim 1, further comprising a layer of foam covering the RF transponder, first antenna element, and second antenna element.

7. The transponder arrangement of claim 6, wherein a dielectric constant of a portion of the substrate between the RF transponder and the third antenna element is greater than a dielectric constant of the layer of foam.

8. The transponder arrangement of claim 1, wherein:
   a first electrical length of the first antenna element is one-fourth wavelength of a radio wave of a target radio frequency;

a second electrical length of the second antenna element is one-fourth wavelength of the radio wave of the target radio frequency; and a third electrical length of the third antenna element is one-half wavelength of the radio wave of the target radio frequency.

9. The transponder arrangement of claim 8, wherein the third antenna element is disposed parallel to the first and second antenna elements.

10. The transponder arrangement of claim 9, wherein the third antenna element is metallic foil.

11. The transponder arrangement of claim 10, wherein the third antenna element has a first end portion, a middle portion, and a second end portion, and the middle portion is wider than the first and second end portions.

12. The transponder arrangement of claim 10, wherein the third antenna element is disposed directly over a major portion of the first antenna element and directly over a major portion of the second antenna element.

13. The transponder arrangement of claim 8, wherein the first antenna element and the second antenna element comprise wire having a round cross section.

* * * * *